(12) United States Patent
Wang et al.

(10) Patent No.: US 9,513,829 B1
(45) Date of Patent: Dec. 6, 2016

(54) TRANSACTION LOGGING USING ROUND-ROBIN BLOCK ALLOCATION AND I/O SIZE BASED PARTITIONS

(71) Applicant: EMC Corporation, Hopkinton, MA (US)

(72) Inventors: Yubing Wang, Southborough, MA (US); Philippe Armangau, Acton, MA (US); Christopher A. Seibel, Walpole, MA (US); Jean-Pierre Bono, Westborough, MA (US); Yining Si, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/753,430

(22) Filed: Jun. 29, 2015

(51) Int. Cl.
*G06F 11/14* (2006.01)
*G06F 3/06* (2006.01)
*G06F 17/30* (2006.01)
*G06F 9/46* (2006.01)
*G06F 9/30* (2006.01)
*G06F 12/14* (2006.01)

(52) U.S. Cl.
CPC ............ *G06F 3/0619* (2013.01); *G06F 3/065* (2013.01); *G06F 3/067* (2013.01); *G06F 3/0644* (2013.01); *G06F 11/1471* (2013.01); *G06F 11/1474* (2013.01); *G06F 17/30362* (2013.01); *G06F 9/3004* (2013.01); *G06F 9/467* (2013.01); *G06F 12/14* (2013.01)

(58) Field of Classification Search
CPC .. G06F 11/1471; G06F 11/1474; G06F 9/467; G06F 9/3004; G06F 12/14; G06F 12/1446

USPC .................. 711/150, 154, 163; 707/648, 682
See application file for complete search history.

(56) References Cited

U.S. PATENT DOCUMENTS

| 5,778,388 A * | 7/1998 | Kawamura et al. .......... 707/203 |
| 7,631,009 B1 | 12/2009 | Patel et al. |
| 9,361,306 B1 * | 6/2016 | Pawar et al. .................. 707/648 |
| 2007/0300013 A1* | 12/2007 | Kitamura ....................... 711/114 |
| 2012/0079215 A1* | 3/2012 | Gray et al. .................... 711/146 |
| 2012/0311246 A1* | 12/2012 | McWilliams et al. ........ 711/103 |
| 2013/0304714 A1* | 11/2013 | Lee et al. ...................... 707/703 |

OTHER PUBLICATIONS

Uresh Vahalia, et al.; "Metadata Logging in an NFS Server"; Proceedings of the Summer 1993; Usenix Technical Conference; Jun. 1993; pp. 111-128.

* cited by examiner

*Primary Examiner* — Than Nguyen
(74) *Attorney, Agent, or Firm* — BainwoodHuang (57) ABSTRACT

A technique for storing data in a log receives a set of sequential requests, each request specifying data to be written to a data object served by a data storage system. The data specified by respective ones of the requests is placed into respective lockable units of storage for the log, such that the data of no two sequential requests are stored within the same lockable unit. Each lockable unit is locked for access by a writer when being written, and unlocked when not being written, and is configured to store data specified by multiple requests. Completion of each of the requests is acknowledged in response to placing the data specified by the respective request in one of the lockable units of storage. The log may also be partitioned, with individual partitions being used to store data specified by requests having specific request sizes.

20 Claims, 8 Drawing Sheets

TRANSACTION LOGGING USING ROUND-ROBIN BLOCK ALLOCATION AND I/O SIZE BASED PARTITIONS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Some data storage systems employ transaction logs for temporarily persisting changes in data of the data objects they serve. For example, a data storage system may receive a request from a host machine to perform a write operation on a data object served from the data storage system. In response to receiving the request, the data storage system stores the data specified in the request as a transaction in a transaction log. Once the transaction log has stored the transaction, the data storage system can acknowledge back to the host that the operation specified in the request has been completed. Subsequently, the data storage system can synchronize the data stored in the transaction log to the data object. The data storage system can then retire the transaction from the log, e.g., to make room for new transactions.

SUMMARY

A multithreaded storage system may allow multiple threads to concurrently write log entries to a transaction log. Unfortunately, while providing concurrency for transaction log writes improves throughput, performance issues may arise when multiple threads attempt to simultaneously write to the same region within the log. For example, in order to store the data specified, each write request may require that the thread performing the write operation i) lock the page containing the portion of the log being written, ii) perform the write operation to the portion of the log being written, and then iii) unlock the page for access by other threads also having write operations for the page. Accordingly, while one thread performs a write operation to a given page within the log, the page is unavailable to any other threads also having write operations for it. When large numbers of threads attempt to simultaneously perform write operations to the same page within the log, large amounts of contention may occur, causing threads to be paused while waiting for pages to be released by other threads performing writes to the same page. As a result, system performance may be negatively impacted, as acknowledgements back to hosts are delayed while threads await access to the regions in the log. As a result, IO request latency may suffer.

In contrast with the prior approach, an improved technique for storing data in a log of a data storage system includes receiving, from a host, a set of sequential requests, each request specifying data to be written to a data object served by the data storage system. The data specified by respective ones of the requests is placed into respective lockable units of storage for the log such that the data of no two sequential requests are stored within the same lockable unit. Each lockable unit is constructed and arranged to be locked for access by a writer when being written and to be unlocked when not being written, and each of the lockable units is configured to store data specified by multiple requests. The technique further includes acknowledging, to the host, completion of each of the requests in response to placing the data specified by the respective request in one of the lockable units of storage.

The log may be partitioned into chunks, each one of the chunks associated with a set of lockable units. Placing the data specified by the requests may include storing data specified by requests directed to respective ones of the chunks into the sets of lockable units associated with the respective chunks.

In some examples, individual chunks may be pre-allocated to store data specified by requests having specific request sizes. For example, a first one of the chunks may be pre-allocated to store data specified by requests of a first request size, and a second one of the chunks may be pre-allocated to store data specified by requests of a second request size. Data specified by requests of the first request size is then stored into lockable units associated with the first one of the chunks, and data specified by requests of the second request size is then stored into lockable units associated with the second one of the chunks.

In one example, each chunk may have a size equal to an aggregate size of the flush operations performed in the system. For example, each flush operation may be performed on a predetermined number of lockable units storing data specified by at least one of the requests, and synchronize the data from those lockable units to the data object served by the data storage system. The aggregate size of the flush operation is the total size of all the lockable units flushed in a single flush operation. In a further example, individual flush operations may be performed on individual respective ones of the chunks contained within the log.

In another example, each chunk includes multiple segments, and each segment is supported by a respective one of the lockable units associated with the chunk containing the segment. For each of the chunks, placing data into the chunk indicated by sequentially received requests may include selecting individual segments within the chunk on a round robin basis.

Advantageously, the improved technique enables operation in which data specified by sequentially received requests is placed into different lockable units, thus avoiding contention between different threads, such as that which results from previous approaches that allow data specified by consecutive requests to be placed in the same lockable unit. By reducing contention over the lockable units supporting the log, the technique reduces or eliminates thread pauses caused when threads simultaneously attempt to access the same lockable unit. The disclosed technique accordingly reduces delays in storing data into the log, and latency is therefore reduced with regard to providing acknowledgements to hosts.

Certain embodiments are directed to a method for storing data in a log of a data storage system. The method includes receiving, from a requestor, a set of three or more sequential requests, each request specifying data to be written to a data object served by the data storage system, and placing the data specified by respective ones of the requests into respective lockable units of storage for the log, such that the data of no two sequential requests are stored within the same lockable unit, wherein each lockable unit is constructed and arranged to be locked for access by a writer when being written and to be unlocked when not being written, and wherein each of the lockable units is configured to store data specified by multiple requests. The method further includes acknowledging, to the requestor, completion of each of the requests in response to placing the data specified by the respective request in one of the lockable units of storage.

Other embodiments are directed to a data storage system constructed and arranged to perform the method described above. Still other embodiments are directed to a computer program product. The computer program product stores instructions which, when executed on control circuitry of a data storage system, cause the data storage system to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for storing data in a log of a data storage system includes receiving, from a host, a set of sequential requests, each request specifying data to be written to a data object served by the data storage system. The data specified by respective ones of the requests is placed into respective lockable units of storage for the log such that the data of no two sequential requests are stored within the same lockable unit. Each lockable unit is constructed and arranged to be locked for access by a writer when being written and to be unlocked when not being written, and each of the lockable units is configured to store data specified by multiple requests. The technique further includes acknowledging, to the host, completion of each of the requests in response to placing the data specified by the respective request in one of the lockable units of storage.

Figure 1:
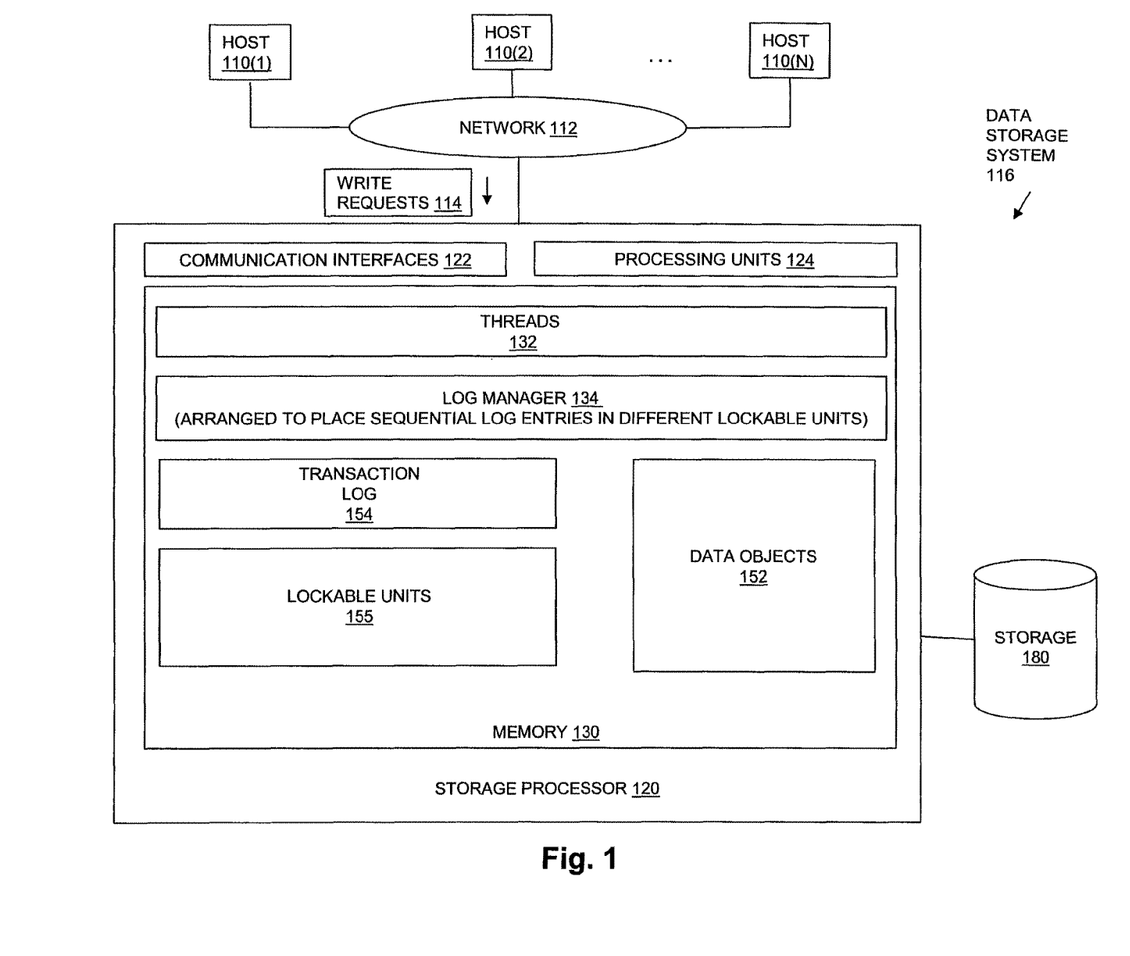
FIG. 1 is a block diagram showing a data storage system including an embodiment of the disclosed technique, in an example of an environment in which embodiments of the disclosed technique may be practiced.

FIG. 1 shows an example environment in which embodiments of the improved technique hereof can be practiced. Multiple host computing devices ("hosts"), shown as devices 110(1) through 110(N), access a data storage system 116 over a network 112. The data storage system 116 includes a storage processor, or "SP," 120 and storage 180. The data storage system 116 may include multiple SPs like the SP 120. In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host I/Os.

The storage 180 may, for example, include one or more RAID groups, where each RAID group is composed of multiple disk drives. The disk drives may include magnetic disk drives, electronic flash drives, optical drives, and/or other types of drives. In a typical example, each RAID group may include disk drives of a common type that provide similar performance.

The network 112 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive I/O requests, including but not limited to write requests 114, according to block-based and/or file-based protocols, and to respond to such I/O requests by reading and/or writing the storage 180. Although the data storage system 116 may be capable of receiving and processing both block-based requests and file-based requests, the invention hereof is not limited to data storage systems that can do both.

The SP 120 is seen to include one or more communication interfaces 122, a set of processing units 124, and memory 130. The communication interfaces 122 include, for example, SCSI target adapters and network interface adapters for converting electronic and/or optical signals received over the network 112 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and/or daemons.

As further shown in FIG. 1, the memory 130 includes data objects 152. Data objects 152 are served to the hosts 110(1-N), and the write requests 114 are directed to data objects 152. Data objects 152 are served to the hosts 110(1-N) by the data storage system 116. For example, data objects 152 may include objects served through file-based storage services, such as file systems or the like, and/or file-based virtual volumes (VVols). Alternatively, or in addition, data objects 152 may include objects served through block-based storage services, such as logical disks or logical units (LUNs), and/or block-based virtual volumes (VVols). The data storage system 116 may expose the data objects 152 to hosts(1-N) systems for access by the hosts(1-N) in accordance with respective storage service protocols. Thus, data storage system 116 may expose block-based data objects (e.g., LUNs and/or block-based VVols) through Fiber Channel or iSCSI protocols, and/or may expose file-based objects (e.g., file systems and/or file-based VVols) using NFS, CIFS, or SMB protocols.

The memory 130 further includes (i.e., realizes by operation of programming code) threads 132 and a log manager 134. Threads 132 include execution threads that execute concurrently within storage processor 120, and that are used to concurrently process the received write requests 114. When the storage processor 120 receives one of write requests 114, one of the threads 132 persistently stores the data specified by the request as a log entry in transaction log 154. Once the thread has stored the data specified by the request in transaction log 154, the data storage system 116 can acknowledge back to the host that issued the request that the operation specified in the request has been completed. In an example, storage of log entries into the transaction log 154 is persistent; however, this is merely an example, as storage may be volatile in implementations that provide no guarantees of error-free operation.

Transaction log 154 may be arranged as a circular buffer, and may include a head and a tail. Generally speaking, new log entries are placed at the tail of transaction log 154, and older log entries are flushed from the head. Log manager 134 processes incoming write requests to transaction log 154, by placing the log entries for sequential write requests into positions within the transaction log 154 that are supported by different ones of lockable units 155, using the techniques disclosed herein.

For example, in an example of operation, storage processor 120 may receive, from one of hosts 110(1-N), a set of three or more sequential ones of the write requests 114, each of the received requests specifying data to be written to one of the data objects 152 served to the hosts 110(1-N) by the data storage system 116. The data specified by respective ones of the received requests are placed by the log manager 134 into respective ones of lockable units 155 for the transaction log 154, such that the data of no two sequential requests are stored within the same lockable unit.

Each of the lockable units 155 may, for example, be a lockable page within a cache located within memory 130, and accordingly may be locked for access by a writer, such as one of threads 132, when being written. In other words, when one of the threads 132 places data specified by one of write requests 114 into a log entry in the transaction log 154, the lockable unit that stores the portion of the log in which the log entry is located is first locked. While the lockable unit is locked, no other ones of the threads 132 can access the portion of transaction log 154 stored in that lockable unit. The thread then, while the lockable unit is locked, writes the data specified by the request into the lockable unit. After the data specified by the request has been written to the locked lockable unit, the lockable unit is unlocked for access by other threads.

Each one of the lockable units 155 is operable to store data specified by multiple ones of the write requests 114. For example, each of the lockable units 155 may be of a size large enough to store data specified by multiple ones of the write requests 114. For example, in the case where the write requests 114 each indicate data of 8 KB in size, and each of the lockable units 155 is 64 KB in size, each one of the lockable units 155 is of a size large enough to store data specified by eight of the write requests 114.

Lockable units 155 may be provided as units of any specific type of storage. In one embodiment, for example, the lockable units 155 may be provided as part of a cache implemented in DRAM (Dynamic Random Access Memory). Although DRAM is normally regarded as volatile (non-persistent) memory, persistence of the DRAM and thus of the lockable units may be achieved through the use of batteries that provide backup power in the event of a power loss and thus enable the DRAM to hold its contents in place until power can be restored.

In response to the log manager 134 placing the data specified by each one of the received requests into a lockable unit 155, the data storage system 116 may issue an acknowledgement message to one of hosts 110(1-N), i.e., the one that issued the request (e.g. over network 112), the acknowledgement message indicating completion of the request. The host receives the message and proceeds with its activities, having received acknowledgement that the data specified by the request has been safely received.

Log manager 134 may also perform flushing of log entries from transaction log 154, e.g., on a regular basis and/or in response to the size of transaction log 154 reaching a high water mark, in order to prevent transaction log 154 from becoming full. Flushing a log entry from transaction log 154 may be accomplished by synchronizing (i.e. writing) the data from that log entry to an appropriate location or locations within one of the data objects 152. The log manager 134 may then retire the log entry from the log, e.g., to make room for data specified by new requests.

Figure 2:
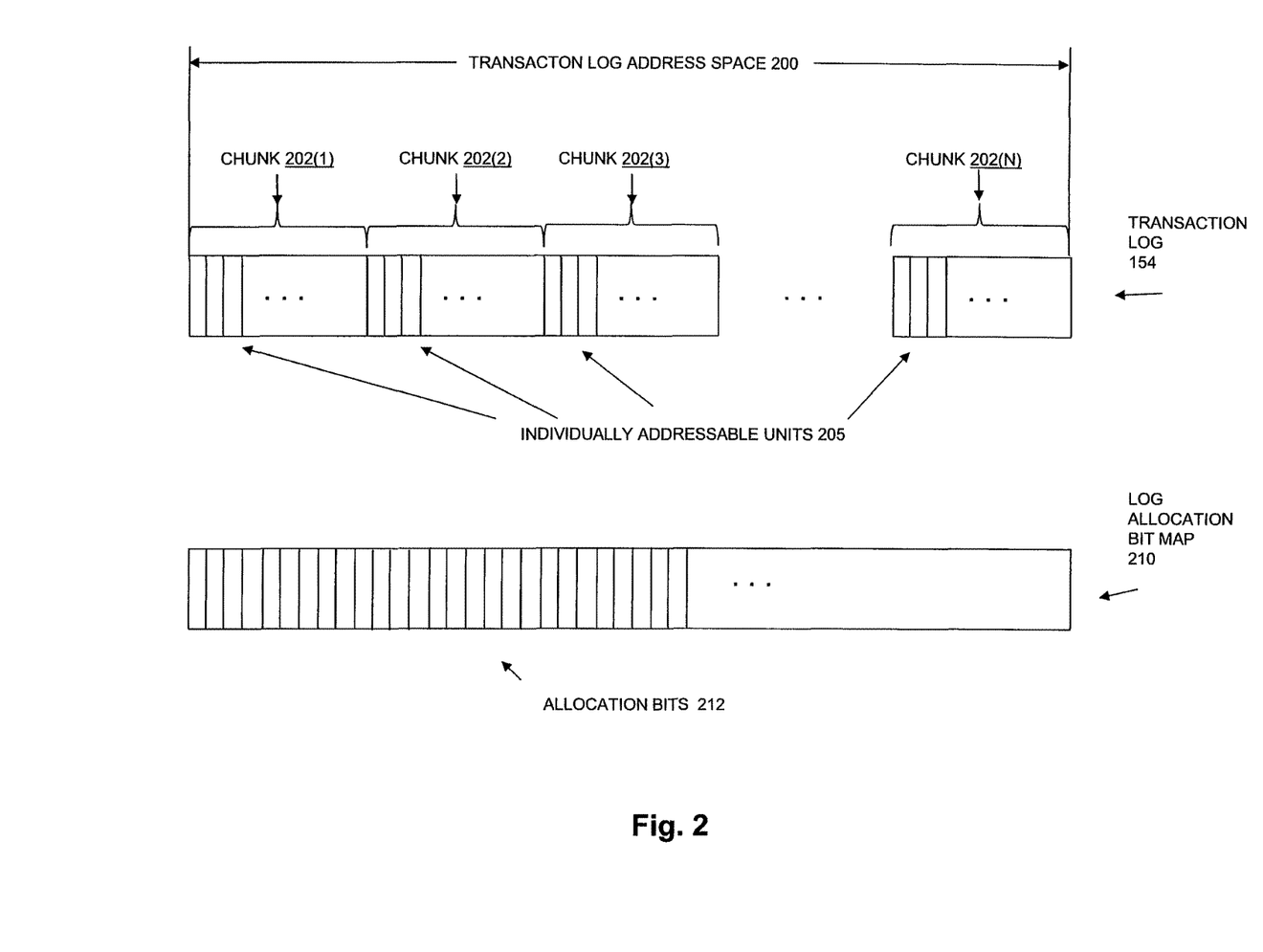
FIG. 2 is a block diagram showing an example of a transaction log partitioned into chunks and a log allocation bitmap.

As shown in FIG. 2, the transaction log 154 is accessed within a transaction log address space 200. As further shown in FIG. 2, the transaction log 154 may be partitioned into chunks 202(1-N). In an example, the chunks 202(1-N) are each made up of an equal number of the individually addressable units 205 contained within the transaction log address space 200. For example, each of the addressable units 205 may have a size equal to a size of a smallest allocatable unit of storage. In one embodiment, for example, each of the addressable units 205 corresponds to a "block" of storage, which may be 8 KB in size, although blocks may be provided in any suitable denomination.

In one embodiment, the size of each of the chunks 202(1-N) may be set equal to an aggregate size of a flush operation. For example, log manager 134 may perform each flush of log entries from transaction log 154 by synchronizing data stored on a predetermined number of the lockable units 155 to one of the data objects 152. The total size of the predetermined number lockable units whose data is synchronized during a single flush operation may be referred to as an "aggregate" size of the flush operation. For example, if each lockable unit has a size of 64 KB (sixty-four kilobytes), and the predetermined number of lockable units that is synchronized during a single flush operation is thirty-two (32), the aggregate size of the flush operation is 2 MB (two megabytes). In such an embodiment, the size of each of the chunks 202(1-N) may accordingly be set to 2 MB. In a further example, individual flush operations may be performed with regard to individual respective ones of the chunks contained in the log.

Also shown in FIG. 2 is log allocation bit map 210, which is used to allocate space within the transaction log 154. In an example, each of the allocation bits 212 corresponds to one of the addressable units 205 in transaction log 154. The state of each of the allocation bits 212 indicates whether the corresponding one of the addressable units 205 in transaction log 154 has been allocated to a log entry. For example, a set bit (e.g. a bit value of "1") may be used to indicate that the corresponding addressable unit is allocated for the corresponding addressable unit, and a clear bit (e.g. a bit value of "0") may be used to indicate that the corresponding addressable unit is not allocated. When a log entry is added to transaction log 154, the bit(s) in those of allocation bits 212 corresponding to the addressable unit(s) for the new log entry is/are set. When a log entry is removed from transaction log 154 (e.g., by flushing), the bit(s) in allocation bits 212 corresponding to the addressable unit(s) for the log entry is/are cleared.

Figure 3:
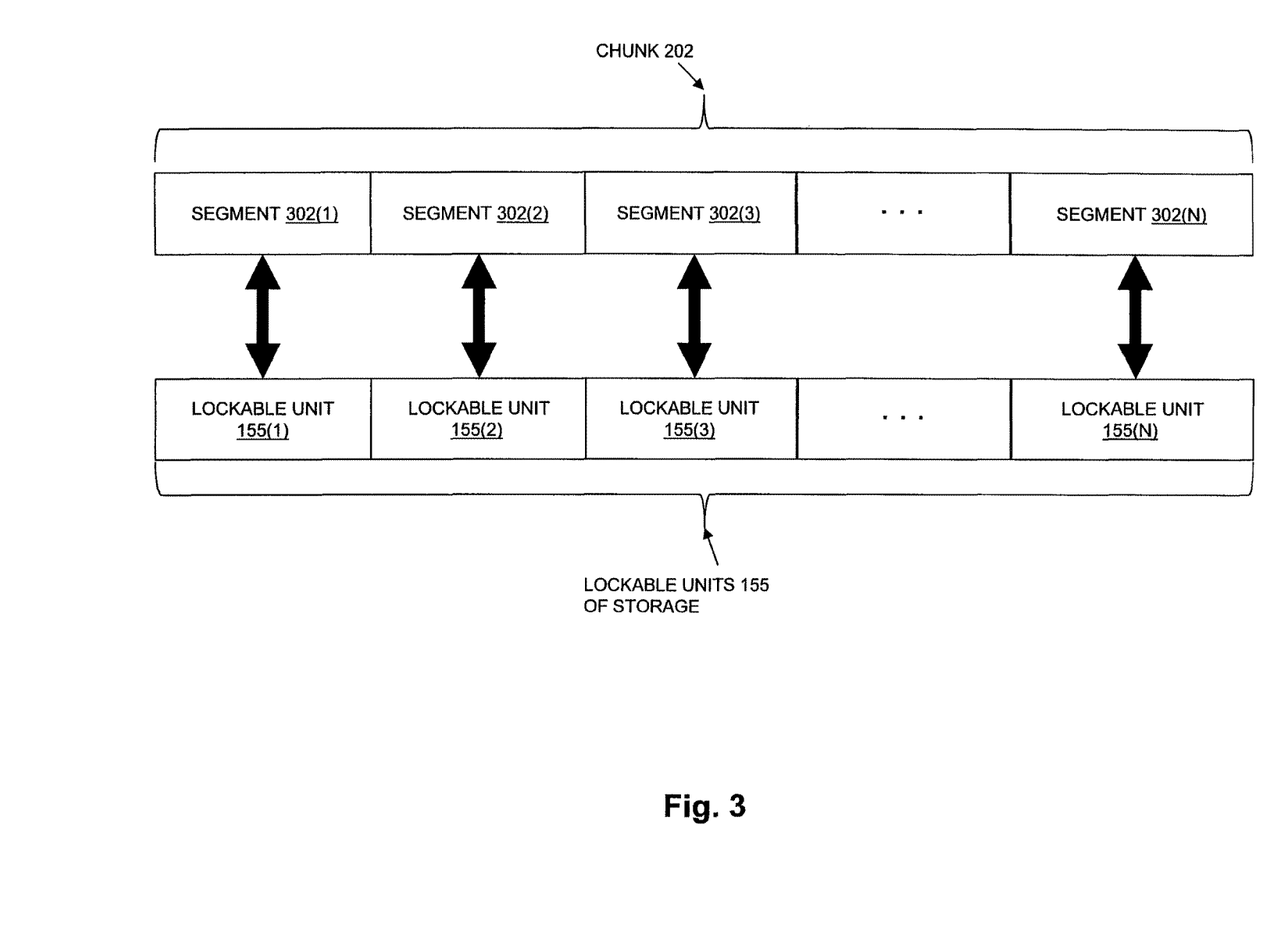
FIG. 3 is a block diagram showing an example of a chunk divided into segments, with lockable units supporting corresponding ones of the segments.

FIG. 3 is a block diagram showing an example of a chunk 202 divided into multiple, equal size segments 302(1-N). A set of lockable units 155 is associated with chunk 202, and is used to store data specified by received write requests for which log entries are located within chunk 202. Each one of the segments 302(1-N) is supported by one of the lockable units 155(1-N), such that each log entry located in one of the segments 302(1-N) is stored in the corresponding one of the lockable units 155(1-N). In addition, each log entry located within a segment may be stored at the same relative position within the corresponding lockable unit. For example, log entries located in segment 302(1) may be stored in corresponding positions of lockable unit 155(1), log entries located in segment 302(2) may be stored in corresponding positions of lockable unit 155(2), log entries located in segment 302(3) may be stored in corresponding positions of lockable unit 155(3), and so on for each of the segments 302(1-N).

In the illustrative embodiment of FIG. 2, each of the segments 302(1-N) has a size equal to the size of one of the lockable units 155. For example, in one embodiment, in which chunk 202 has a size of 2 MB, each one of the segments 302(1-N) and each one of the lockable units 155(1-N) has a size of 64 KB. It will be recognized, however, that the disclosed technique is not limited to these specific sizes, and that the sizes of chunk 202, segments 302(1-N) and/or lockable units 155(1-N) may be set to other specific sizes as appropriate for other embodiments and/or operational environments.

In the disclosed technique, when write requests are received for which log entries are to be added to chunk 202 of the transaction log, a round robin selection process is applied such that sequential ones of the segments 302(1-N) are selected, in a circular manner, to identify which one of the segments 302(1-N) to use for each new log entry. For example, if a log entry for an initially received write request is added within segment 302(1), then a log entry for the next received write request is added within segment 302(2), and then a log entry for the next received write request is added within segment 302(3), and so on through segment 302(N), with the selection process then wrapping around to begin selecting again starting with segment 302(1), and so on, e.g., until all addressable elements in all of the segments 302(1-N) have been used to add log entries to the transaction log for received write requests. As a result, since each one of the segments 302(1-N) is supported by a different one of the lockable units 155(1-N), the disclosed technique stores data from each N sequentially received write operations in different ones of the lockable units 155(1-N). Advantageously, the data for each N consecutively received write operations is located by the present technique in different ones of the segments 302(1-N), and accordingly is stored in different ones of the lockable units 155(1-N), thus reducing contention among writers (e.g. among threads 132 in FIG. 1) with respect to individual ones of the lockable units 155(1-N).

Figure 4:
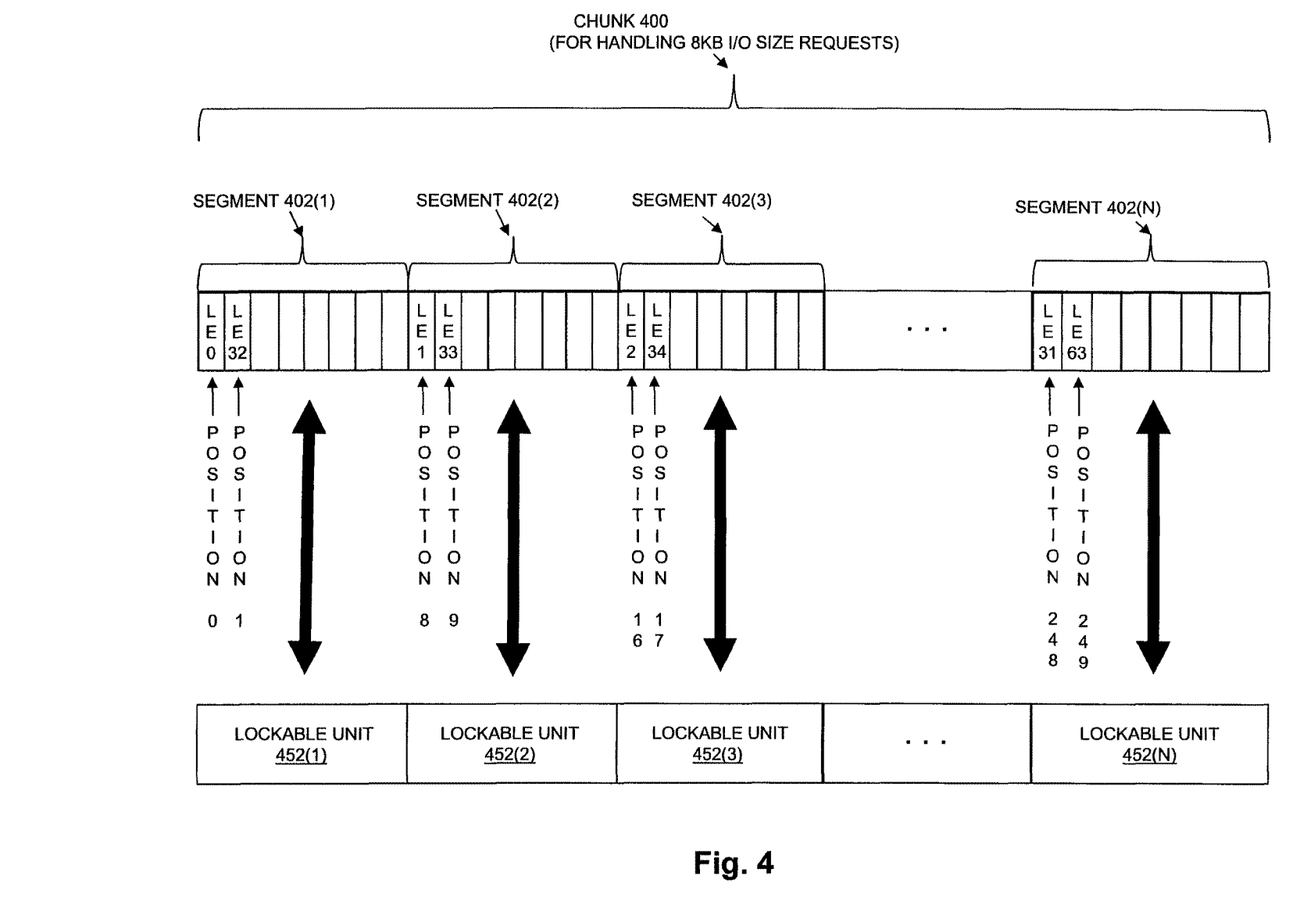
FIG. 4 is a block diagram showing an example of a chunk divided into segments, with lockable units supporting corresponding ones of the segments, and storing data specified by requests of a first request size.

FIG. 4 is a block diagram showing an example of a chunk 400 divided into segments 402(1-N), with each one of lockable units 452(1-N) supporting a corresponding one of the segments 402(1-N). In the example of FIG. 4, chunk 400 is 2 MB in size and includes 256 addressable units of 8 KB each. Each of the addressable units in chunk 400 is located at a position between position 0 and position 255 within chunk 400. Each of the segments 402(1-N) is 64 KB in size and includes 8 addressable units. Each of the lockable units 452(1-N) is also 64 KB in size and is used to store the data for the addressable units within the corresponding one of segments 402(1-N).

In the example of FIG. 4, chunk 400 is used to create log entries for write requests having a size of 8 KB. Each such request is, for example, a request received from a host (e.g. one of hosts 110(1-N) in FIG. 1) to store 8 KB of data into a data object served to the host from the data storage system (e.g. one of data objects 152 in FIG. 1). In one embodiment, write requests having request sizes less than 8 KB may be rounded up to be handled as having a request size of 8 KB. In the example of FIG. 4, the 8 KB of data for each write request requires a log entry having a size of 8 KB, and accordingly each log entry uses one of the addressable units.

As shown in FIG. 4, log entries are created within chunk 400 for a series of sequentially received write requests, using the disclosed technique for selecting individual segments from within segments 402(1-N) on a round robin basis. In response to receipt of a first write request, the disclosed technique selects segment 402(1), since segment 402(1) is the first segment within segments 402(1-N). A first log entry for chunk 400, log entry 0 (LE0), is then created at the first available addressable unit within segment 402(1), i.e. at position 0. The data from the first write request may then be stored at a corresponding location within lockable unit 452(1).

In response to receipt of a second write request, the disclosed technique selects the next segment in segments 402(1-N) following segment 402(1), i.e. segment 402(2). A second log entry for chunk 400, log entry 1 (LE1), is then created at the first available addressable unit within segment 402(2), i.e. at position 8. The data from the second write request may then be stored at a corresponding location within the lockable unit 452(2).

In response to receipt of a third write request, the disclosed technique selects the next segment in segments 402(1-N) following segment 402(2), i.e. segment 402(3). A third log entry for chunk 400, log entry 2 (LE2), is then created at the first available addressable unit within segment 402(3), i.e. at position 16. The data from the second write request may then be stored at a corresponding location within the lockable unit 452(3).

As subsequent write requests are received, the disclosed technique continues to select segments on a round robin basis, based on the order of segments 402(1-N) within chunk 400. Accordingly, log entries are similarly created for subsequently received requests in sequential segments following segment 402(3), and when a thirty-second write request is received, the disclosed technique selects the last segment in chunk 400, i.e. segment 402(N). A thirty-second log entry for chunk 400, log entry 31 (LE31), is then created at the first addressable unit within segment 402(N), i.e. at position 248. The data from the thirty-second write request may then be stored at a corresponding location within the lockable unit 452(N).

After selecting segment 402(N) for log entry 31, when the next write request is received (the thirty-third received request), the round robin selection technique wraps around to the beginning of chunk 400, and accordingly again selects the first segment within chunk 400, i.e. segment 402(1). In this way the round robin selection technique operates in a circular manner with respect to selecting individual segments from the segments 402(1-N). A log entry 32 (LE32) is then created at the next available addressable unit within segment 402(1), i.e. the addressable unit at position 1. The data from the thirty-third write request may then be stored at a corresponding location within the lockable unit 452(1).

When the thirty-fourth request is received, the disclosed technique selects the next one of the segments 402(1-N) i.e. segment 402(2). The disclosed technique then creates log entry 33 (LE33) at the next available addressable unit within segment 402(2), i.e. the addressable unit at position 9. The data from the thirty-fourth write request may then be stored at a corresponding location within the lockable unit 452(2). When the thirty-fifth request is received, the disclosed technique selects the next one of the segments 402(1-N), i.e. segment 402(3), and creates log entry 34 (LE34) at the next available addressable unit within segment 402(3), i.e. the addressable unit at position 17. The data from the thirty-fifth write request may then be stored at a corresponding location within the lockable unit 452(3).

Again, the disclosed technique continues to select segments on a round robin basis, based on the order of segments 402(1-N) within chunk 400. Accordingly, log entries are again created for subsequently received requests in sequential segments following segment 402(3), and when a sixty-fourth write request is received, the disclosed technique again selects the last segment in chunk 400, i.e. segment 402(N). A sixty-fourth log entry for chunk 400, log entry 63 (LE63), is then created at the next available addressable unit within segment 402(N), i.e. at position 249. The data from the sixty-fourth write request may then be stored at a corresponding location within the lockable unit 452(N).

As further write requests are received, the disclosed technique continues to select segments for the corresponding log entries on a round robin basis within segments 402(1-N), until all the addressable units within chunk 400 have been used up, and chunk 400 is accordingly full. At that point, log entries for further received 8 KB write requests may be allocated from another chunk within the transaction log.

Figure 5:
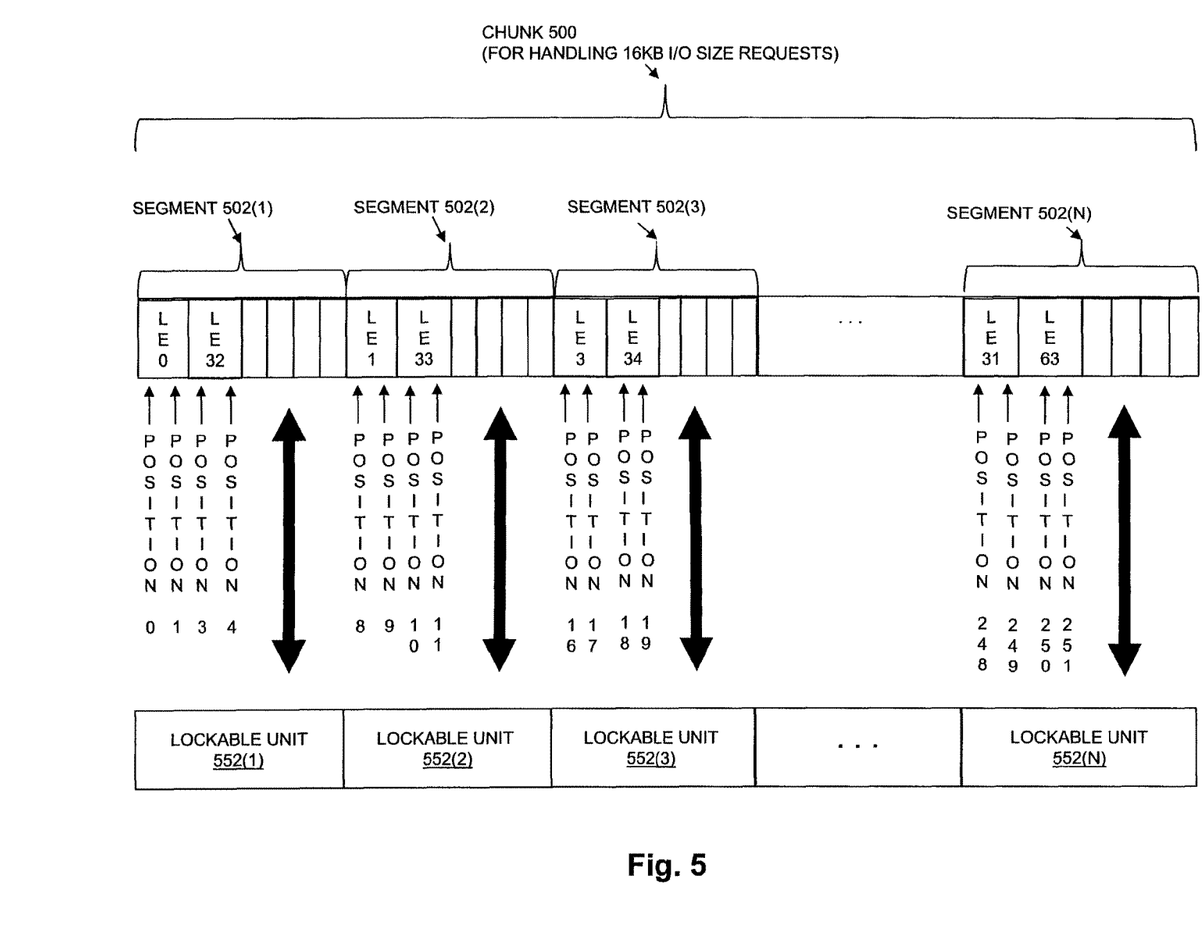
FIG. 5 is a block diagram showing another example of a chunk divided into segments, with lockable units supporting corresponding ones of the segments, and storing data specified by requests of a second request size.

FIG. 5 is a block diagram showing a chunk 500 divided into segments 502(1-N), with lockable units 552(1-N) supporting corresponding ones of the segments 502(1-N). In the example of FIG. 5, chunk 500 is also 2 MB in size, and includes 256 addressable units of 8 KB. Each of the addressable units in chunk 500 is located at a position between position 0 and position 255 within chunk 500. Each of the segments 502(1-N) is 64 KB in size and includes 8 addressable units. Each of the lockable units 552(1-N) is accordingly also 64 KB in size and is used to store the data for the addressable units within the corresponding one of segments 502(1-N).

In the example of FIG. 5, chunk 500 is used to handle write requests having a size of 16 KB. Each such request is a request received from a host (e.g. one of hosts 110(1-N) in FIG. 1) to store 16 KB of data into a data object served to the host from the data storage system (e.g. one of data objects 152 in FIG. 1). In one embodiment, write requests having request sizes greater than 8 KB but less than 16 KB may be rounded up to be handled as having a request size of 16 KB. In the example of FIG. 5, the 16 KB of data for each write request requires a log entry of 16 KB, and accordingly each log entry uses two of the addressable units.

Like FIG. 4, FIG. 5 illustrates how log entries are created, albeit within chunk 500 and for a series of sequentially received 16 KB write requests, again using the disclosed technique for selecting individual segments from within segments 502(1-N) on a round robin basis. Now with reference to the example of FIG. 5, in response to receipt of an initial or first write request, the disclosed technique selects segment 502(1), since segment 502(1) is the first segment within segments 502(1-N). A first log entry for chunk 500, log entry 0 (LE0), is then created at the first two available addressable units within segment 502(1), i.e. at positions 0 and 1 within chunk 500. The data from the first write request may then be stored at corresponding locations within lockable unit 552(1).

In response to receipt of a second write request, the disclosed technique selects the next segment in segments 502(1-N) following segment 502(1), i.e. segment 502(2). A second log entry for chunk 500, log entry 1 (LE1), is then created at the first two addressable units within segment 502(2), i.e. at positions 8 and 9 within chunk 500. The data from the second write request may then be stored corresponding locations within the lockable unit 552(2).

In response to receipt of a third write request, the disclosed technique selects the next segment in segments 502(1-N) following segment 502(2), i.e. segment 502(3). A third log entry for chunk 500, log entry 3 (LE3), is then created at the first two addressable units within segment 502(3), i.e. at positions 16 and 17. The data from the second write request may then be stored at corresponding locations within the lockable unit 552(3).

As subsequent write requests are received, the disclosed technique continues to select segments on a round robin basis, based on the order of segments 502(1-N) within chunk 500. Accordingly, log entries are similarly created for subsequently received requests within segments following segment 502(3), and when a thirty-second write request is received, the disclosed technique selects the last segment in chunk 500, i.e. segment 502(N). A thirty-second log entry for chunk 500, log entry 31 (LE31), is then created at the first two addressable units within segment 502(N), i.e. at positions 248 and 249. The data from the thirty-second write request may then be stored at corresponding locations within the lockable unit 552(N).

After selecting segment 502(N) for log entry 31, when the next write request is received (the thirty-third received request), the round robin selection technique wraps around to the beginning of chunk 500, and accordingly again selects the first segment within chunk 500, i.e. segment 502(1). In this way the round robin selection technique operates in a circular manner with respect to selecting individual segments from the segments 502(1-N). A log entry 32 (LE32) is then created at the next two available addressable units within segment 502(1), i.e. the addressable units at positions 3 and 4. The data from the thirty-third write request may then be stored at corresponding locations within the lockable unit 552(1).

When the thirty-fourth request is received, the disclosed technique selects the next one of the segments 502(1-N) i.e. segment 502(2). The disclosed technique then creates log entry 33 (LE33) at the next two available addressable units within segment 502(2), i.e. the addressable units at positions 10 and 11. The data from the thirty-fourth write request may then be stored at locations corresponding locations within the lockable unit 552(2). When the thirty-fifth request is received, the disclosed technique selects the next one of the segments 502(1-N), i.e. segment 502(3), and creates log entry 34 (LE34) at the next two available addressable units within segment 502(3), i.e. the addressable units at positions 18 and 19. The data from the thirty-fifth write request may then be stored at corresponding locations within the lockable unit 552(3).

Again, the disclosed technique continues to select segments on a round robin basis, based on the order of segments 502(1-N) within chunk 500. Accordingly, log entries are similarly created for subsequently received requests in sequential segments following segment 502(3), and when a sixty-fourth write request is received, the disclosed technique again selects the last segment in chunk 500, i.e. segment 502(N). A sixty-fourth log entry for chunk 500, log entry 63 (LE63), is then created using the next two available addressable units within segment 502(N), i.e. at positions 250 and 251. The data from the sixty-fourth write request may then be stored at corresponding locations within lockable unit 552(N).

As further write requests are received, the disclosed technique continues to select segments for the corresponding log entries on a round robin basis within segments 502(1-N), until all the addressable units within chunk 500 have been used up, and chunk 500 is accordingly full. At that point, log entries for further received 16 KB write requests may be allocated from another chunk within the transaction log.

Figure 6:
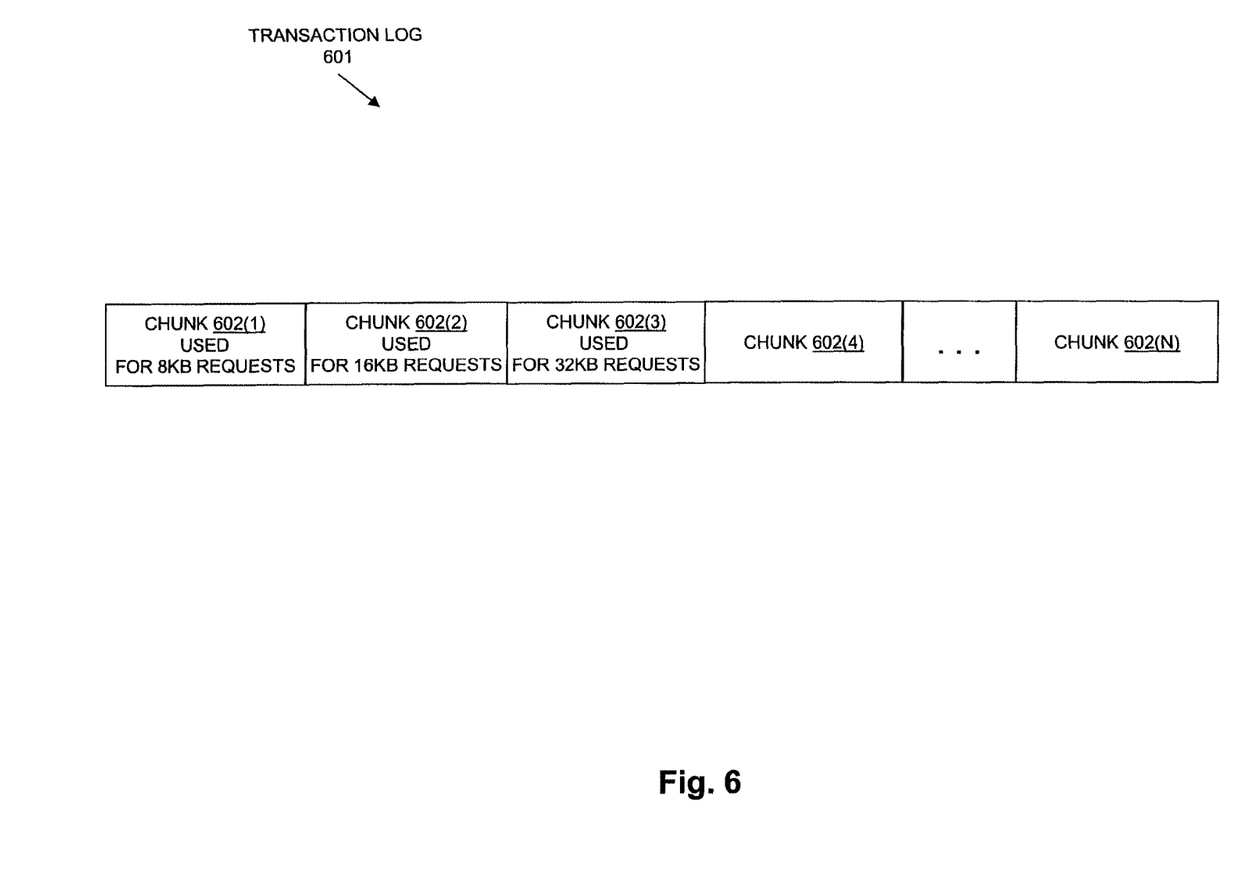
FIG. 6 is a block diagram showing an example of a transaction log partitioned into chunks, where some of the chunks are pre-allocated to store data specified in requests of specific request sizes.

In order for the transaction log to accommodate different sizes of write requests, each chunk may be associated with a single size of write request. Accordingly, in some embodiments of the disclosed technique, individual chunks are used exclusively for requests having a single request size. In one example, as shown in FIG. 6, a transaction log 601 may be partitioned into a number of chunks 602(1-N), such that chunk 602(1) is used to create log entries for 8 KB write requests, chunk 602(2) is used to create log entries for 16 KB write requests, and chunk 602(3) is used to create log entries for 32 KB write requests. In one example, chunks 602(1) through 602(3) may each be pre-allocated for the respective size of write requests. Chunks 602(4) through 602(N) may be unallocated, and/or may be subsequently pre-allocated in a similar manner.

During operation of the example shown in FIG. 6, when 8 KB size write requests are received, chunk 602(1) is used to receive log entries for those requests. Chunk 602(1) is not used for log entries for requests of any other size. Similarly, when 16 KB size write requests are received, chunk 602(2) is used to receive log entries for those requests, and chunk 602(2) is not used for log entries for requests of any other size. And when 32 KB size write requests are received, chunk 602(3) is used to receive log entries for those requests, and chunk 602(3) is not used for log entries for requests of any other size. Data specified by 8 KB size requests is accordingly stored into the set of lockable units associated with chunk 602(1), data specified by 16 KB size requests is stored into the set of lockable units associated with chunk 602(2), and data specified by 32 KB size requests is stored into the set of lockable units associated with chunk 602(3).

Those skilled in the art will recognize that the specific configuration of chunks shown in FIG. 6 is only for purposes of explanation, and the disclosed technique is not limited to the specific chunks and/or write request sizes shown therein. Instead, the disclosed technique may be used with any specific number of individual chunks being exclusively used to create log entries for write requests of a specific size. Additionally, any specific request size may be used and associated with a corresponding chunk, such that the corresponding chunk is only used for log entries generated in response to requests of that specific size of request.

Figure 7:
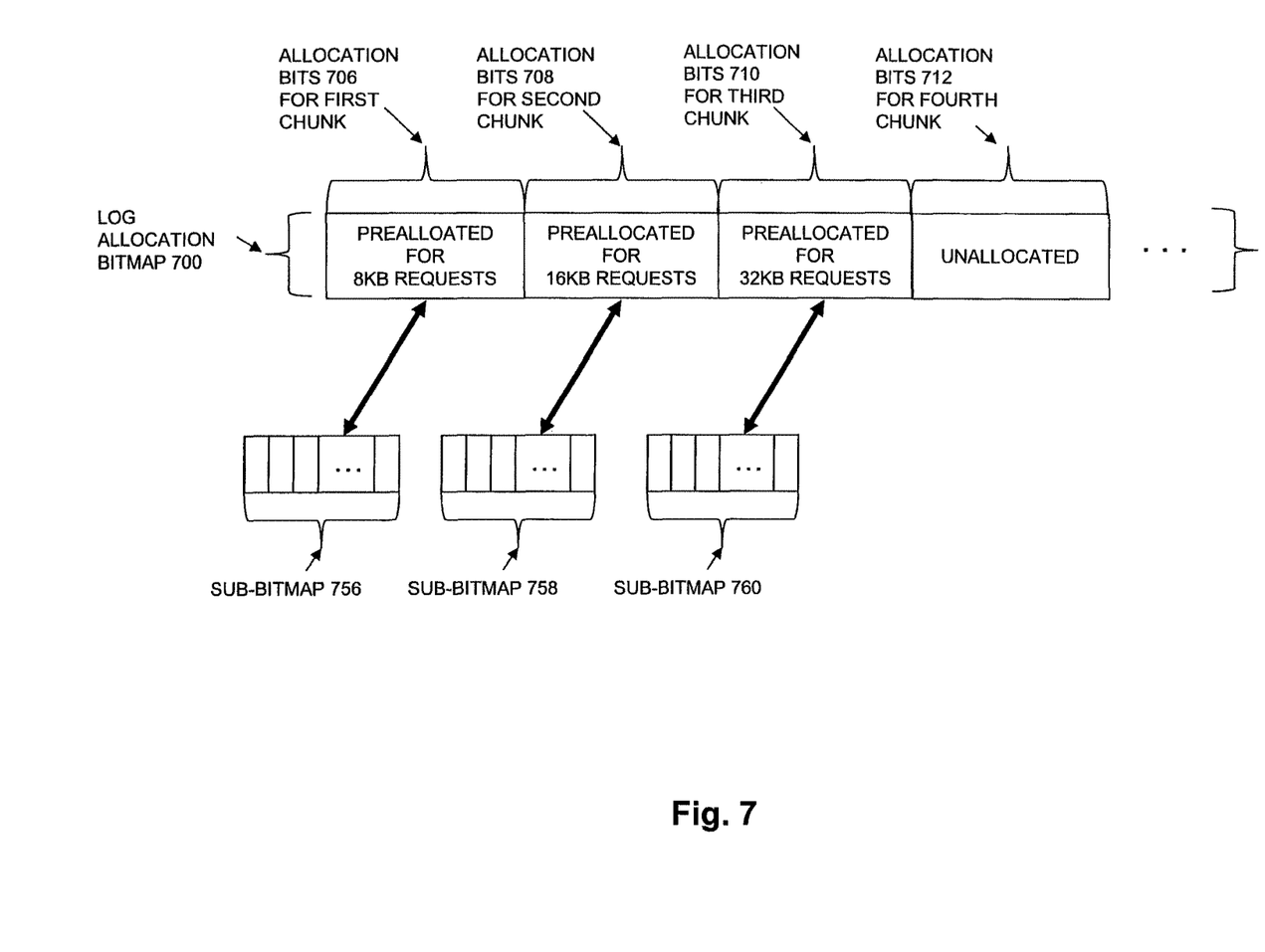
FIG. 7 is a block diagram showing a log allocation bitmap for a log having pre-allocated chunks for corresponding request sizes, and sub-bitmaps created for the pre-allocated chunks.

In an embodiment in which different chunks are used for different sizes of write requests, different chunks may use different numbers of addressable units for each log entry. To address this case, FIG. 7 illustrates an embodiment of the disclosed technique in which specific chunks are pre-allocated for write requests of specific sizes, and in which sub-bitmaps are created for each pre-allocated chunk, each sub-bitmap containing allocation bits representing the actual allocation state of the addressable units in the chunk. As shown in FIG. 7, an example of a log allocation bitmap 700 corresponds to the transaction log 601 shown in FIG. 6. When a first 8 KB write request is received, the disclosed technique sets all the allocation bits 706 for the first chunk (e.g. chunk 602(1) in FIG. 6), in order to pre-allocate all the addressable units in the first chunk, such that log entries can only be created in the first chunk for write requests that have a size of 8 KB. When the first chunk is pre-allocated in response to the first 8 KB write request, the sub-bitmap 756 is created. The allocation bits in sub-bitmap 756 are then used to indicate the actual allocation state of the addressable units in the first chunk. When the first 8 KB write request is received, only one bit is set in the sub-bitmap 756, indicating that one of the addressable units in the first chunk has been allocated for the log entry for the first 8 KB request. As subsequent 8 KB write requests are received, the allocation bits for the resulting log entries in the first chunk are set in sub-bitmap 756.

Similarly, when a first 16 KB write request is received, the disclosed technique sets all the allocation bits 708 for the second chunk (e.g. chunk 602(2) in FIG. 6), in order to pre-allocate all the addressable units in the second chunk, such that log entries can only be created in the second chunk for write requests that have a size of 16 KB. When the second chunk is pre-allocated in response to the first 16 KB write request, the sub-bitmap 758 is created. The allocation bits in sub-bitmap 758 are then used to indicate the actual allocation state of the addressable units in the second chunk. When the first 16 KB write request is received, only two bits are set in the sub-bitmap 758, indicating that two of the addressable units in the second chunk have been allocated for the log entry for the first 16 KB request. As subsequent 16 KB write requests are received, the allocation bits for the resulting log entries in the second chunk are set in sub-bitmap 758.

When a first 32 KB write request is received, the disclosed technique sets all the allocation bits 710 for the third chunk (e.g. chunk 602(3) in FIG. 6), in order to pre-allocate all the addressable units in the third chunk, such that log entries can only be created in the third chunk for write requests that have a size of 32 KB. When the third chunk is pre-allocated in response to the first 32 KB write request, the sub-bitmap 760 is created. The allocation bits in sub-bitmap 760 are then used to indicate the actual allocation state of the addressable units in the third chunk. When the first 32 KB write request is received, only four bits are set in the sub-bitmap 760, indicating that four of the addressable units in the third chunk have been allocated for the log entry for the first 32K request. As subsequent 32K write requests are received, the allocation bits for the resulting log entries in the third chunk are set in sub-bitmap 760.

In the example of FIG. 7, the allocation bits 712 for the fourth chunk are unallocated.

In one example, each of the sub-bitmaps 756, 758 and 760 may also store their respective locations within the log allocation bitmap 700. In the event that a sub-bitmap becomes full, a new chunk is pre-allocated for the corresponding request size, and a new sub-bitmap created for the newly pre-allocated chunk. The sub-bitmap that became full is no longer needed. Accordingly, only one sub-bitmap need be maintained for a specific request size at any given time.

If a write request is not aligned to a request size for which a chunk may be pre-allocated (e.g. has a size that is not a power of two), the request size will be rounded up to the closest request size for which a chunk may be pre-allocated (e.g. to the closest power of two), and a log entry created for the request in a chunk associated with that particular request size.

When log entries are flushed from the transaction log, any addressable units that remain unallocated in a given sub-bitmap are freed for re-use by clearing all the allocation bits in the log allocation bitmap 700 that were set when the chunk associated with the sub-bitmap was pre-allocated.

Figure 8:
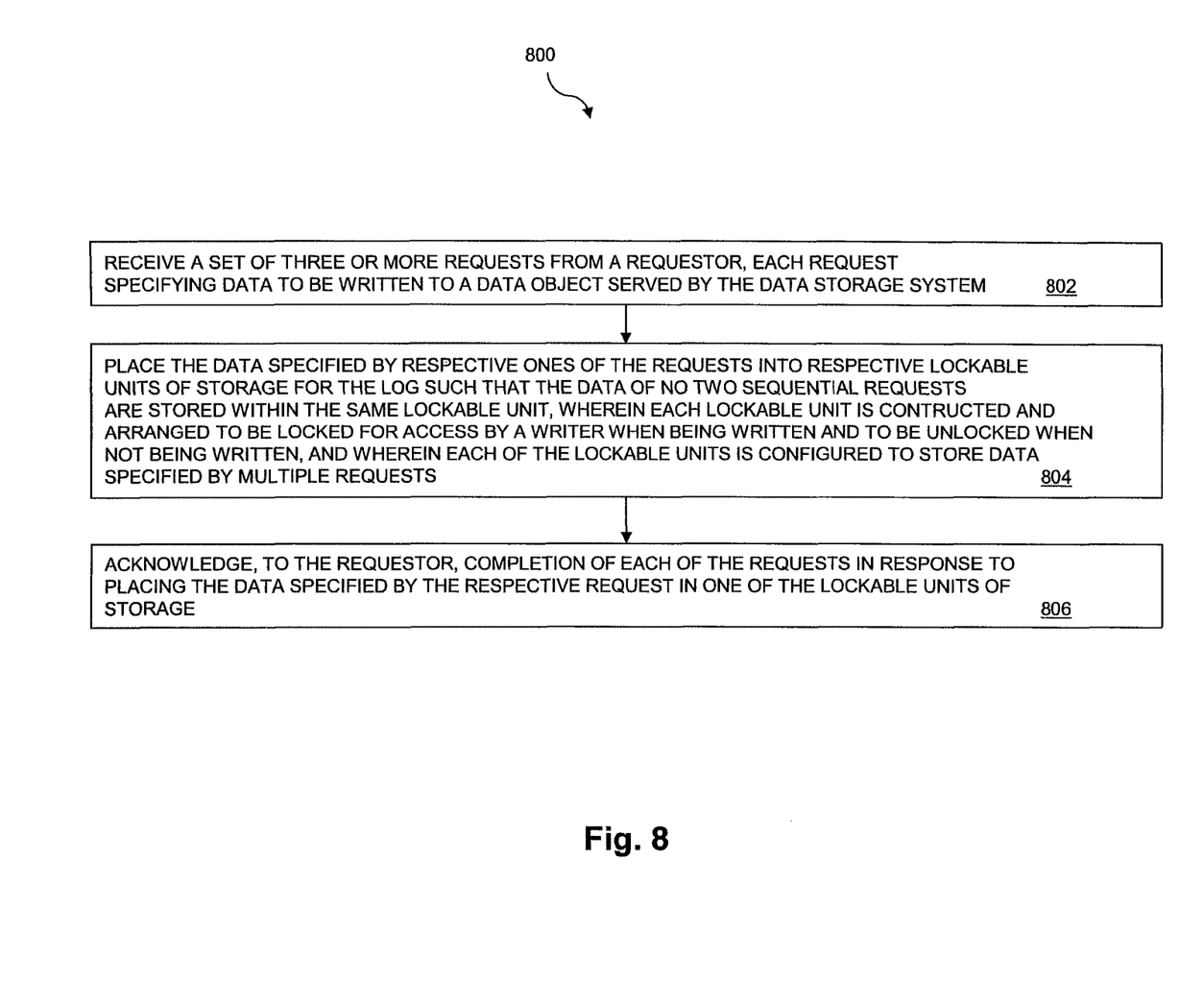
FIG. 8 is a flow chart showing an example of a process for storing data in a log of a data storage system using the disclosed technique.

FIG. 8 shows an example process 800 that may be carried out in connection with the computing environment of FIG. 1. The process is typically performed by the software constructs described in connection with FIGS. 1-7, which reside in the memory 130 of SP 120 and are run by the set of processing units 124. The various acts of the process 800 may be ordered in any suitable way. Accordingly, embodiments may be constructed in which acts are performed in orders different from those illustrated, which may include performing some acts simultaneously, even though the acts are shown as sequential in the illustrated embodiments.

At 802, a set of three or more requests is received from a requestor. The requests may, for example, be write requests, such as write requests 114, that specify data to be written to a data object served by the data storage system, such as one of data objects 152 served by data storage system 116. The requestor may be a host computing system, such as one of hosts 110(1-N), or a software entity running thereon. Alternatively, the requestor may be a software entity within the data storage system 116 (i.e., requests may arise internally).

At 804, data specified by respective ones of the received requests is placed into respective lockable units, such respective ones of the lockable units 155, such that the data of no two sequential requests are stored within the same lockable unit. Each of the lockable units may, for example, be a lockable page of a cache contained within memory 130, that may be locked for access by a writer, such as by one of the threads 132, when being written, and that is unlocked when not being written by one of the threads 132. Each of the lockable units is able to store data specified by multiple received requests, for example by having a size large enough to store the data specified by multiple ones of the write requests 114.

At 806, an acknowledgement is issued to the requestor, indicating completion of each of the received requests. For example, the data storage system 116 may transmit one or more acknowledgement messages to one of the hosts 110 (1-N) from which the requests were received over network 112. The acknowledgement is issued for each of the requests in response placing the data specified by the request in one of the lockable units 155, and indicates to the requestor that the request has been completed.

Having described certain embodiments, numerous alternative embodiments or variations can be made. For example, while the above description makes reference to storing data specified by write requests into log entries within a transaction log, the disclosed technique is not so limited. Accordingly, those skilled in the art will recognize that the disclosed technique may alternatively be applied to storing metadata into log entries within a transaction log. Also, while certain sizes of objects and structures are used within examples given in the above description (e.g. sizes of chunks, segments, write requests, etc.), the specific sizes given are only for purposes of explanation, and those skilled in the art will further recognize that the disclosed technique may be embodied using other specific sizes for one or more of the objects described, as may be appropriate for certain configurations, deployments, and/or operational environments.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method for storing data in a log of a data storage system, the method comprising:
   receiving, from a requestor, a set of three or more sequential requests, each request specifying data to be written to a data object served by the data storage system;
   placing the data specified by respective ones of the requests into respective lockable units of storage for the log such that the data of no two sequential requests are stored within the same lockable unit, wherein each lockable unit is constructed and arranged to be locked for access by a writer when being written and to be unlocked when not being written, and wherein each of the lockable units is configured to store data specified by multiple requests; and
   acknowledging, to the requestor, completion of each of the requests in response to placing the data specified by the respective request in one of the lockable units of storage.

2. The method of claim 1, wherein the log includes at least one chunk, the chunk supported by a set of lockable units; and
   wherein placing the data specified by respective ones of the requests into respective lockable units of storage for the log includes creating a log entry in the chunk for each one of a set of the requests and storing the data specified by each one of the requests in the set into a different one of the lockable units in the set of lockable units associated with the chunk.

3. The method of claim 2, wherein each chunk is divided into a plurality of segments, each one of the segments supported by a respective one of the lockable units in the set of lockable units that support the chunk containing the segment; and
   wherein storing the data specified by each of the requests in the set in a different one of the lockable units in the set of lockable units that support the chunk includes selecting a different segment within the chunk for each of the requests in the set and storing the data specified by each of the requests in the set into the lockable unit supporting the segment selected for the request.

4. The method of claim 3, wherein the segments within the chunk have a sequential order;
   wherein selecting a different segment from within the chunk for each of the requests in the set includes selecting segments from the segments in the chunk on a round robin basis based on the sequential order of segments within the chunk.

5. The method of claim 4, wherein the sequential order of the segments within the chunk is from a first segment within the chunk to a last segment within the chunk; and
   wherein selecting individual segments from the segments in the chunk on a round robin basis includes selecting segments in a circular manner, wherein the first segment in the chunk is selected following selection of the last segment in the chunk.

6. The method of claim 2, wherein the log is partitioned into a plurality of chunks, and further comprising:
   pre-allocating a first one of the chunks for requests of a first request size;
   pre-allocating a second one of the chunks for requests of a second request size;
   storing data specified by requests of the first request size to the set of lockable units associated with the first one of the chunks; and
   storing data specified by requests of the second request size to the set of lockable units associated with the second one of the chunks.

7. The method of claim 6, further comprising:
   wherein a flush operation is configured and arranged to operate on a predetermined number of lockable units storing data specified by at least one of the requests, wherein the aggregate size of the flush operation is equal to the total size of the predetermined number of lockable units on which the flush operation operates, and wherein the flush operation includes synchronizing data stored on the predetermined number of lockable units to the data object served by the storage system; and
   wherein each chunk has a size equal to the aggregate size of the flush operation.

8. The method of claim 6, wherein a top-level bitmap includes a plurality of bits, each of the bits in the top-level bitmap corresponding to an addressable unit within the log;
   wherein pre-allocating the first one of the chunks for requests of the first request size is triggered by receipt of an initial request of the first request size, and includes setting bits in the top-level bitmap corresponding to addressable units within the first chunk to indicate that the first chunk is reserved for data specified by requests of the first request size; and
   wherein pre-allocating the second one of the chunks for requests of the second size is triggered by receipt of an initial request of the second request size, and includes setting bits in the top-level bitmap corresponding to addressable units within the second chunk to indicate that the second chunk is reserved for data specified by requests of the second request size.

9. The method of claim 8, wherein pre-allocating the first one of the chunks for requests of the first request size further includes creating a sub-bitmap for the first one of the chunks, the sub-bitmap for the first one of the chunks storing a plurality of bits, each of the bits in the sub-bitmap for the first one of the chunks indicating whether a corresponding addressable unit within the first one of the chunks has been allocated to a log entry for a request of the first request size; and
   wherein pre-allocating the second one of the chunks for requests of the second request size further includes creating a sub-bitmap for the second one of the chunks, the sub-bitmap for the second one of the chunks storing a plurality of bits, each of the bits in the sub-bitmap for the second one of the chunks indicating whether a corresponding addressable unit within the second one of the chunks has been allocated to store a log entry for a request of the second request size.

10. The method of claim 9, wherein the data storage system serves the data object to a plurality of host computing devices;
    wherein the requestor comprises one of the host computing devices;
    wherein the data object served by the data storage system comprises a logical unit (LUN);

wherein the requests received by the storage system include write requests indicating data to be written to the LUN served by the data storage system;

wherein the data storage system includes multiple threads;

wherein each one of the requests in the set is processed within the data storage system by a respective one of the multiple threads; and wherein each lockable unit is constructed and arranged to be locked by one of the multiple threads when being written by that one of the multiple threads such that no other ones of the multiple threads can access the lockable unit while it is being written.

11. A data storage system, comprising control circuitry that includes a set of processing units coupled to memory, the control circuitry constructed and arranged to:

receive, from a requestor, a set of three or more sequential requests, each request specifying data to be written to a data object served by the data storage system;

place the data specified by respective ones of the requests into respective lockable units of storage for the log such that the data of no two sequential requests are stored within the same lockable unit, wherein each lockable unit is constructed and arranged to be locked for access by a writer when being written and to be unlocked when not being written, and wherein each of the lockable units is configured to store data specified by multiple requests; and acknowledge, to the requestor, completion of each of the requests in response to placing the data specified by the respective request in one of the lockable units of storage.

12. The data storage system of claim 11, wherein the log includes at least one chunk, the chunk supported by a set of lockable units; and wherein the control circuitry is further constructed and arranged to place the data specified by respective ones of the requests into respective lockable units of storage for the log by, at least in part, creating a log entry in the chunk for each one of a set of the requests and storing the data specified by each one of the requests in the set into a different one of the lockable units in the set of lockable units associated with the chunk.

13. The data storage system of claim 12, wherein each chunk is divided into a plurality of segments, each one of the segments supported by a respective one of the lockable units in the set of lockable units that support the chunk containing the segment; and wherein the control circuitry is further constructed and arranged to store the data specified by each of the requests in the set in a different one of the lockable units in the set of lockable units that support the chunk by, at least in part, selecting a different segment within the chunk for each of the requests in the set and storing the data specified by each of the requests in the set into the lockable unit supporting the segment selected for the request.

14. The data storage system of claim 13, wherein the segments within the chunk have a sequential order; and wherein the control circuitry is further constructed and arranged to select a different segment from within the chunk for each of the requests in the set includes by, at least in part, selecting segments from the segments in the chunk on a round robin basis based on the sequential order of segments within the chunk.

15. The data storage system of claim 14, wherein the sequential order of the segments within the chunk is from a first segment within the chunk to a last segment within the chunk; and wherein the control circuitry is further constructed and arranged to select individual segments from the segments in the chunk on a round robin basis by, at least in part, selecting segments in a circular manner, wherein the first segment in the chunk is selected following selection of the last segment in the chunk.

16. The data storage system of claim 12, wherein the log is partitioned into a plurality of chunks, and the control circuitry is further constructed and arranged to:

pre-allocate a first one of the chunks for requests of a first request size;

pre-allocate a second one of the chunks for requests of a second request size;

store data specified by requests of the first request size to the set of lockable units associated with the first one of the chunks; and store data specified by requests of the second request size to the set of lockable units associated with the second one of the chunks.

17. The data storage system of claim 16, further comprising:

wherein a flush operation in the data storage system is configured and arranged to operate on a predetermined number of lockable units storing data specified by at least one of the requests, wherein the aggregate size of the flush operation is equal to the total size of the predetermined number of lockable units on which the flush operation operates, and wherein the flush operation includes synchronizing data stored on the predetermined number of lockable units to the data object served by the storage system; and wherein each chunk has a size equal to the aggregate size of the flush operation.

18. The data storage system of claim 16, wherein a top-level bitmap includes a plurality of bits, each of the bits in the top-level bitmap corresponding to an addressable unit within the log;

wherein the control circuitry is further constructed and arranged to pre-allocate the first one of the chunks for requests of the first request size in response to receipt of an initial request of the first request size, by setting bits in the top-level bitmap corresponding to addressable units within the first chunk to indicate that the first chunk is reserved for data specified by requests of the first request size; and wherein the control circuitry is further constructed and arranged to pre-allocate the second one of the chunks for requests of the second size in response to receipt of an initial request of the second request size, by setting bits in the top-level bitmap corresponding to addressable units within the second chunk to indicate that the second chunk is reserved for data specified by requests of the second request size.

19. The data storage system of claim 18, wherein the control circuitry is further constructed and arranged to pre-allocate the first one of the chunks for requests of the first request size by also creating a sub-bitmap for the first one of the chunks, the sub-bitmap for the first one of the chunks storing a plurality of bits, each of the bits in the sub-bitmap for the first one of the chunks indicating whether a corresponding addressable unit within the first one of the chunks has been allocated to a log entry for a request of the first request size; and wherein the control circuitry is further constructed and arranged to pre-allocate the second one of the chunks for requests of the second request size further by also creating a sub-bitmap for the second one of the chunks, the sub-bitmap for the second one of the chunks storing a plurality of bits, each of the bits in the sub-bitmap for the second one of the chunks indicating whether a corresponding addressable unit within the second one of the chunks has been allocated to store a log entry for a request of the second request size.

20. A computer program product including a set of non-transitory, computer-readable media having instructions which, when executed by control circuitry of a data storage system, cause the control circuitry to perform a method of storing data in a log of a data storage system, the method comprising:

receiving, from a requestor, a set of three or more sequential requests, each request specifying data to be written to a data object served by the data storage system;

placing the data specified by respective ones of the requests into respective lockable units of storage for the log such that the data of no two sequential requests are stored within the same lockable unit, wherein each lockable unit is constructed and arranged to be locked for access by a writer when being written and to be unlocked when not being written, and wherein each of the lockable units is configured to store data specified by multiple requests; and acknowledging, to the requestor, completion of each of the requests in response to placing the data specified by the respective request in one of the lockable units of storage.

* * * * *